United States Patent [19]
Sukeshita

[11] 3,929,030
[45] Dec. 30, 1975

[54] AUTOMOTIVE STEERING SYSTEM OF RACK AND PINION TYPE HAVING MEANS TO PREVENT DISPLACEMENT OF STEERING SHAFT IN COLLISION

[75] Inventor: Kazumi Sukeshita, Koganei, Japan
[73] Assignee: Nissan Motor Company Limited, Yokohama, Japan
[22] Filed: Dec. 3, 1974
[21] Appl. No.: 529,186

[30] Foreign Application Priority Data
Dec. 7, 1973 Japan.................... 48-139452[U]

[52] U.S. Cl.................................. 74/492; 74/498
[51] Int. Cl.²........................................ B62D 1/18
[58] Field of Search ............ 74/492, 493, 498, 499, 74/500

[56] References Cited
UNITED STATES PATENTS
2,937,881  5/1960  Norrie.................................. 74/492
3,578,782  5/1971  Miyoshi............................. 74/492 X Primary Examiner—Allan D. Herrmann
Attorney, Agent, or Firm—Frank J. Jordan

[57] ABSTRACT

The outer surface of the rack jacket tube and clamp members to clamp the tube to a chassis member are shaped and assembled such that the tube can be turned on its axis in collision of the vehicle. The pinion shaft and the steering shaft are linked with each other through a relay shaft provided with means to shorten the distance between the steering gear box and the lower end of the steering shaft with no displacement of the latter when the rack jacket tube is displaced and turned.

6 Claims, 5 Drawing Figures

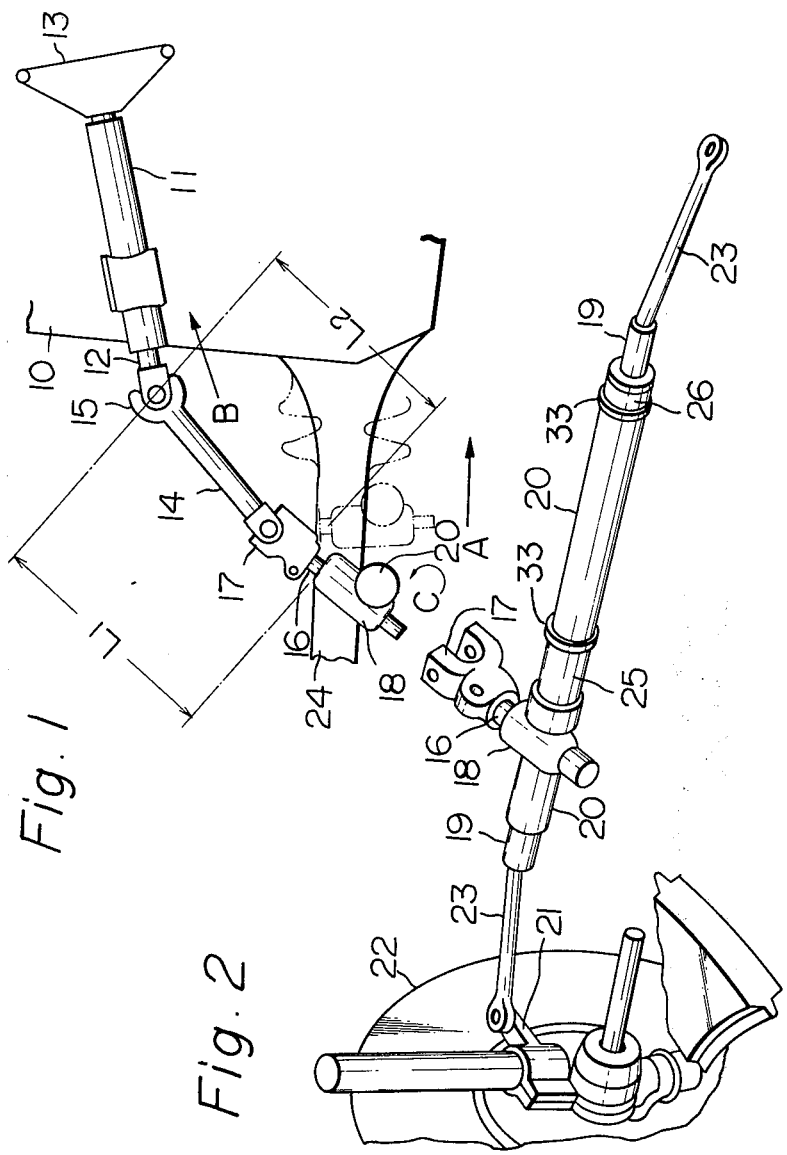

AUTOMOTIVE STEERING SYSTEM OF RACK AND PINION TYPE HAVING MEANS TO PREVENT DISPLACEMENT OF STEERING SHAFT IN COLLISION

This invention generally relates to an automotive steering system having the rack-and-pinion type steering gear and more particularly to a combination of a clamp means to join the rack jacket tube of the steering system to the vehicle chassis and a coupling means for the pinion shaft and steering shaft.

It is a current trend that automotive steering columns are designed to prevent them from being pushed into the driver in head-on collision of automobiles. In fact, various types of impact-absorbing or collapsible steering columns are now in practice. Although the merits of such steering columns are unquestionable, the complicated construction and increased production costs of these steering columns are heavy burdens on every automobile on the market and particularly on small-sized or economical cars.

The present invention relates to a steering system having the rack-and-pinion type steering gear, which system is used in many automobiles and particularly in relatively small and economical ones.

It is an object of the invention to provide a simple and low cost means to prevent an ordinary steering column and/or steering shaft of an automotive steering system having the rack-and-pinion type gear from moving toward the driver in collision of the automobile.

According to the invention, the object is accomplished by a novel clamp means to clamp the rack jacket tube of such a steering system to a vehicle chassis member, which means is employed in combination with another means to move the pinion shaft of the system in collision of the vehicle in such a manner that the distance between the steering gear box and the lower end of the steering shaft is shortened without any substantial displacement of the steering shaft. In the clamp means of the inventio, two clamp regions of the outer surface of the rack jacket are shaped circular-cylindrical and arranged at a distance therebetween, and two clamp members which are shaped to rotatably receive the respective clamp regions attach the rack jacket tube to a member of the chassis. The clamp means further comprises a means to fix the rack jacket tube to the clamp members in such a manner that the rack jacket tube is allowed to be turned on its axis when an external force generally in the longitudinal direction of the vehicle and greater than a predetermined magnitude is exerted on the chassis member.

A combination according to the invention is advantageous mainly in that the dangerous displacement of the steering shaft can be surely prevented by quite simple and costless mechanisms.

The invention will be fully understood from the following detailed description of the preferred embodiments thereof with reference to the accompanying drawings, in which:

FIG. 1 is a schematic and partial side view of an automotive steering system of the rack-and-pinion type in accordance with the invention;

FIG. 2 is a perspective view of a part of the steering linkage of the same system;

Figure 3:
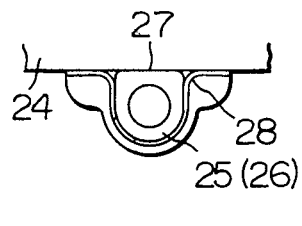
FIG. 3 is a side view of a prior art construction of clamping the rack jacket tube shown in FIGS. 1 and 2 to a chassis member.

FIGS. 1 and 2 illustrate a general linkage of a steering system of the rack-and-pinion type in accordance with the invention. A steering column 11 is fixed to the chassis (no numeral) through a dashboard 10, and a steering shaft 12 is rotatably received in the steering column 11 by means of bearings. The steering shaft 12 is connected to a steering wheel 13 at one end thereof and coupled with a relay shaft 14 at the other end thereof by means of a flexible joint such as a universal joint 15. The relay shaft 14 is in turn coupled with a pinion shaft 16 by means of another flexible joint such as a universal joint 17. The pinion shaft 16 is received in a steering gear box 18 to engage with a steering rack member 19, which is arranged generally laterally of the vehicle and also received in the gear box 18. A major portion of the rack member 19 is loosely enclosed in a rack guide or jacket tube 20, which is divided into two sections and fixed to the gear box 18. Each end of the rack member 19 is linked with a steering arm 21 of a front wheel 22 by means of a side rod 23.

In this well known steering system, the turns of the steering wheel 13 cause the steering shaft 12, relay shaft 14 and the pinion shaft 16 to turn on the respective axes. The resulting turns of the pinion gear (not shown) cause the rack member 19 to move along its longitudinal axis. Thus, the steering arm 21 is pulled or pushed by the side rod 23, and the direction of the front wheel 22 is altered.

The steering gear box 18 is installed on the vehicle classis by clamping the rack jacket tube 20 to a chassis member, usually a side member 24, at two regions 25 and 26 arranged at a suitable distance therebetween. In accordance with conventional constructions to accomplish such clamping, each of the clamp regions 25 and 26 of the rack jacket tube 20 is always shaped to give a flat surface 27 as shown in FIG. 3. The rack jacket tube 20 is arranged such that the two flat surfaces 27 are in intimate contact with the side member 24 and firmly fixed thereto with clamp members 28. Each of these clamp regions 25 and 26 is usually bordered by a flange 33, which is useful for exactly locating the jacket tube 20 with respect to the side member 24 and/or efficiently transmitting a reaction force developed by an axial movement or the rack member 19 to the side member 24.

If the side member 24 collapses or deforms in collision and the rack jacket tube 20 is dragged rearwardly of the automobile or in the direction of the arrow A in FIG. 1, the gear box 18 and hence the pinion shaft 16 are forced to move in the same direction. In such a case, a distance $L_1$ between the universal joint 15 and the steering gear box 18 does not substantially vary despite the provision of the other universal joint 17 because the rack jacket tube 20 is firmly fixed to the side member 24 and hence the pinion shaft 16 cannot move relatively to the side member 24. As a result, the steering shaft 12 and sometimes the steering column 11 are pushed rearwardly and upwardly as shown by the arrow B in FIG. 1 and possibly do injuries to the driver.

According to the invention, the clamp regions 25 and 26 of the rack jacket tube 20 are shaped each to have circular-cylindrical outer surface and clamped to the side member 24 in such a manner that the rack jacket tube 20 can be turned on its axis to a certain extent under an extraordinary condition.

Figure 4:
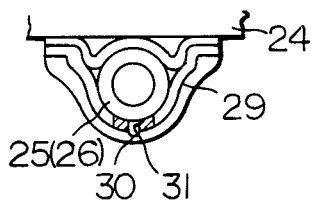
FIG. 4 is a side view, partly in section, of a clamp construction according to the invention.

In a preferred embodiment of the invention shown in FIG. 4, the outer surfaces of the clamp regions 25 and 26 have no flat portion 27, but are shaped circular-cylindrical.

Each clamp region 25 or 26 is rotatably received in a split clamp 29, which is fixed to the side member 24. A key member such as a pin 30 is attached on the surface of each clamp region 25 or 26 to protrude radially therefrom and tightly received in a recess 31 formed in the clamp 29, so that the rack jacket tube 20 cannot normally be turned. The pin 30 is designed so as to be cut by shear if an impulsive force greater than a predetermined magnitude is exerted on the side member 24.

When collision of the vehicle occurs and the side member 24 deforms, the pin 30 is sheared and accordingly the rack jacket tube 20 is allowed to be turned on its axis even though the relative position thereof to the side member 24 is kept unchanged by the clamps 29. The displacement of the gear box 18 and the pinion shaft 16 in the direction of the arrow A due to the deformation of the side member 24 forces the rack jacket tube 20 to turn in the direction of the arrow C in FIG. 1 and causes the pinion shaft 16 to make a rotational movement around the universal joint 17. Consequently, the distance $L_1$ between the steering gear box 18 and the upper universal joint 15 shortens into $L_2$ as shown by the phantom lines in FIG. 1, so that the relay shaft 14 and the steering shaft 12 are almost completely relieved from being thrusted upwardly and rearwardly despite the displacement of the gear box 18 and the pinion shaft 16.

Figure 5:
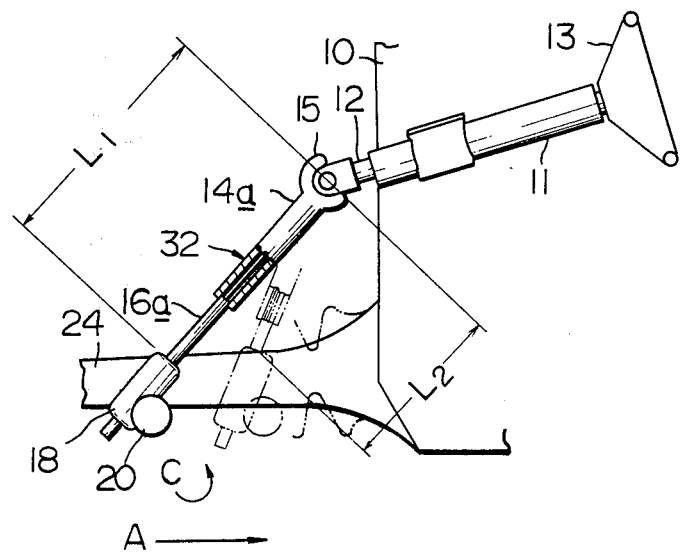
FIG. 5 is a schematic and partial side view, partly in section, of a steering system essentially similar to that of FIG. 1, but different in means to couple the pinion shaft with the steering shaft.

The universal joint 17 plays an important role in combination with the clamp construction of the invention in the prevention of the displacement of the steering shaft 12. However, the distance $L_1$ can be shortened also by other means so long as the rack jacket tube 20 is allowed to turn on the axis thereof. In another embodiment of the invention shown in FIG. 5, the upper end portion of a pinion shaft 16a is inserted into a hollow end portion of a relay shaft 14a. The rack jacket tube 20 is clamped to the side member 24 in the same manner as in the above embodiment of FIG. 4. A coupling mechanism 32, e.g., of the serrations type normally holds the pinion shaft 16a tightly, but allows it to telescope into the relay shaft 14a when the rack jacket tube 20 is dragged in the direction of the arrow A and turns in the direction of the arrow C in FIG. 5. As a result, the distance between the steering gear box 18 and the universal joint 15 is shortened from $L_1$ to $L_2$ as shown in FIG. 5, and the relay shaft 14a makes a rotational movement around the universal joint 15 as shown by the phantom lines in FIG. 5. Thus, the relay shaft 14a scarcely exerts a pushing force on the steering shaft 12, while a large portion of the external force exerted on the pinion shaft 16a is absorbed in the telescoping movement thereof. Accordingly, the steering shaft 12 and hence the steering column 11 are securely prevented from a substantial displacement toward the driver. The coupling mechanism 32 may alternatively be of bellows type.

What is claimed is:

1. In an automotive steering system having a rack-and-pinion type steering gear, the steering shaft being linked with the pinion shaft through a relay shaft, the relay shaft being coupled with the steering shaft by a flexible joint, the rack member being enclosed in a rack jacket tube integrated with the steering gear box and arranged generally laterally of the vehicle, the combination of (a) first means to clamp the rack jacket tube to a chassis member, said first means comprising two clamp regions of the outer surface of the rack jacket tube, said clamp regions being shaped circular-cylindrical and arranged at a distance therebetween, two clamp members fixed to the chassis member and shaped to rotatably receive said two clamp regions, respectively, and second means to fix the rack jacket tube to the clamp members in such a manner that the rack jacket tube is allowed to be turned on the axis thereof when an external force generally in the longitudinal direction of the vehicle and greater than a predetermined magnitude is exerted on the chassis member, and (b) third means to move the pinion shaft such that the distance between the gear box and the flexible joint is shortened without any substantial displacement of the steering shaft, when the rack jacket tube moves generally rearwardly of the vehicle and turns on the axis thereof.

2. A combination according to claim 1, wherein said (b) third means is a flexible joint coupling said pinion shaft with said relay shaft.

3. A combination according to claim 1, wherein said (b) third means is a slide coupling in which an end portion of said pinion shaft is slidably inserted into a hollow end portion of said relay shaft.

4. A combination according to claim 1, wherein said second means comprises a pin member fixed to each of said clamp regions to protrude radially therefrom and a recess formed in each of said clamp members to tightly receive said pin member, said pin member having such a shear strength that said pin member is cut by shear when said external force is exerted on said chassis member.

5. A combination according to claim 1, wherein each of said clamp members is a split clamp dividable into two portions.

6. A combination according to claim 1, wherein said chassis member is a side member of the chassis.

* * * * *